Feb. 26, 1963    J. A. SANDERS    3,078,565
MAGNETIC CHUCK ADAPTER PLATE
Filed July 29, 1957

INVENTOR.
JOSEPH A. SANDERS
BY Whittemore,
Hulbert & Belknap
ATTORNEYS

United States Patent Office 3,078,565
Patented Feb. 26, 1963

3,078,565
MAGNETIC CHUCK ADAPTER PLATE
Joseph A. Sanders, Detroit, Mich., assignor to Goddard & Goddard Company, Detroit, Mich., a corporation of Michigan
Filed July 29, 1957, Ser. No. 674,861
6 Claims. (Cl. 29—529)

The present invention relates to a magnetic chuck adapter plate.

Magnetic chucks in general comprise flat supporting plates including magnets adapted, constantly or selectively, to attract bodies of magnetic material placed thereon for machining operation. The bodies to be machined may be placed directly upon the magnetic chuck if they include flat supporting surfaces so located as to expose the portion of the body to be machined. In many cases however, the body to be machined is not adapted to be supported upon a flat supporting surface and in this case adapters are required.

In accordance with prior practice, adapters have been made by providing elongated rods of magnetic material in a supporting matrix of a non-magnetic metal such for example as aluminum. It has been impossible to produce a satisfactory adapter by casting the magnetic rods in the non-magnetic metal, due primarily to different coefficients of expansion. Prior to the present invention magnetic chuck adapters have been produced by providing a block of non-magnetic metal such for example as aluminum, drilling a multiplicity of cylindrical holes in parallel arrangement entirely through the block, reaming the holes to a slight taper, providing correspondingly tapered rods of magnetic material, and driving the rods into firm engagement in the tapered holes. One surface of the adapter thus produced is a plane surface adapted to be supported in surface to surface contact upon the flat supporting surface of the magnetic chuck. The opposite surface of the adapter is then machined to correspond to and to fit with appropriate portions of a work piece and to support the work piece in positions for machining and/or other operations.

The foregoing production of magnetic chucks was extremely expensive involving hours of labor and subject to the peril of destruction of the adapter by splitting of the block as the pins are driven into firm engagement. The operation was subject to a further serious disadvantage in that the danger of splitting the block increased as the last pins were driven home, since forces developed by the separate pins are cumulative.

In accordance with the present invention the adapter is produced by casting pins formed of magnetic material in a dimensionally stable resin. The pins may be properly supported and spaced by one or more perforated plates during the pouring of the liquid resin. The cast adapter may be shaped in the casting to conform to surfaces of the work piece and thus eliminate or at least minimize subsequent machining.

With the foregoing general description in mind, it is an object of the present invention to provide adapter plates which are more easily and economically manufactured than prior magnetic chuck adapter plates.

It is a further object of the present invention to produce magnetic chuck adapter plates by an operation in which the adapter plate is cast to the shape of the part or work piece to be held.

It is a further object of the present invention to provide a magnetic chuck adapter plate which is dimensionally stable and extremely accurate.

It is a further object of the present invention to provide a magnetic chuck adapter plate having positive dielectric properties, and resistance to oil and most chemicals.

It is a further object of the present invention to provide a magnetic chuck adapter plate by a method which permits the production of large size plates at low cost.

It is a further object of the present invention to provide magnetic chuck adapter plates by a process which permits tooling for special jobs rapidly and economically.

It is a further object of the present invention to provide magnetic chuck adapter plates by a process of casting in liquid resin which eliminates intricate machining since the adapter plates are molded to the shape of the part or work piece.

Other objects and features of the invention will become apparent as the description proceeds, especially when taken in conjunction with the accompanying drawings, illustrating preferred embodiments of the invention, wherein.

Figure 1:
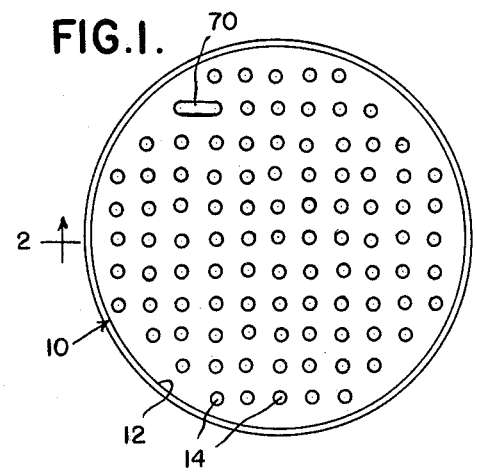
FIGURE 1 is a plan view of a simple adapter plate of cylindrical form.

The magnetic chuck adapter plate indicated generally at 10 in FIGURE 1 is illustrated as a solid cylindrical body having a cylindrical shell 12 formed of a non-magnetic material such for example as aluminum or the like. Within the shell 12 the chuck comprises a multiplicity of pins 14 formed of a suitable magnetic material such for example as iron. The pins are solidly embedded in a matrix of a resin material indicated at 16. In order for the pins to be firmly and solidly held in the matrix, the pins are cast in the resin while the resin is in liquid form. Accordingly, it is essential to employ a resin material which is dimensionally stable as it changes from liquid to solid phase. The resin which has been found to operate perfectly in this regard is epoxy resin.

In use the magnetic chuck adapter plate is supported on a magnetic chuck, a portion of which is indicated at 20. Due to the properties of the magnetic material of the pins 14, a work piece engaged on the upper surface of the magnetic chuck adapter plate 10 will be firmly attracted thereto and held in position for machining.

Figure 2:
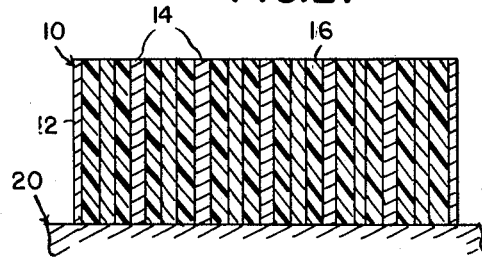
FIGURE 2 is a section on the line 2—2, FIGURE 1.

The adapter plate illustrated in FIGURES 1 and 2 is suitable for supporting work pieces having flat surfaces engageable on the flat upper surface of the adapter plate. The magnetic chuck adapter plate illustrated in FIGURES 1 and 2 is also suitable for subsequent machining to conform its upper surface to interfit with a corresponding surface of a work piece.

Thus for example, the adapter plate illustrated in FIGURES 1 and 2 may be produced in quantity by the manufacturer and supplied to the various tool shops or manufacturers, who may machine the upper surface of the adapter plates in accordance with the specific requirements of their work pieces. The composite material consisting of epoxy resin with iron pins firmly embedded therein may be produced very economically and readily machined to cooperate with a particular work piece. Thus, it is possible for the consumer, in an economical manner, to produce adapter plates for a wide variety of working pieces. Moreover, it will be apparent that the adapter plate may be machined a plurality of times to confirm it to a series of different work pieces.

Figure 3:
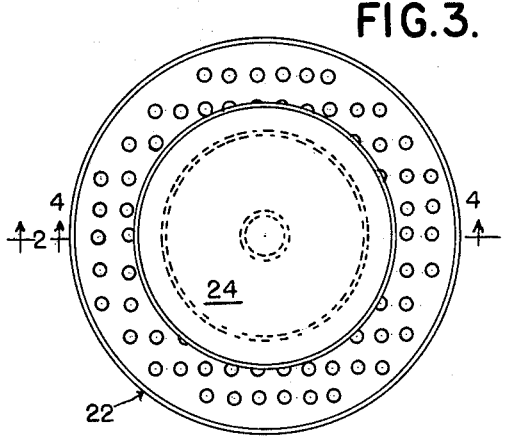
FIGURE 3 is a plan view of an adapter plate shaped to cooperate with a particular work piece.
Figure 4:
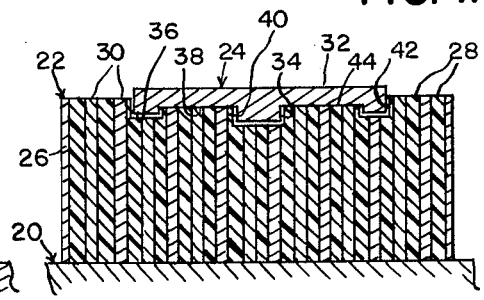
FIGURE 4 is a section on the line 4—4, FIGURE 3.

Referring now to FIGURES 3 and 4 there is illustrated an arrangement of an adapter plate 22 shaped to interfit with a particular work piece 24. In this case the adapter plate comprises the outer shell of non-magnetic material 26 and the supporting matrix 28 of dimensionally stable resin, in which is embedded the multiplicity of pins 30 formed of magnetic material. By way of example, the work piece 24 is shown as having an upper flat surface 32 which is to be machined, and a lower supporting surface including a central stud 34 and an annular flange 36. Intermediate the stud and flange there is a flat annular surface 38 by means of which the work piece is to be supported.

As shown, the upper surface of the adapter plate is provided with a central pocket 40 which loosely receives the stud 34, and an annular groove or channel 42 which loosely receives the flange 36. Intermediate the recess or pocket 40 and the channel 42 the upper surface of the adapter plate is provided with a flat annular supporting surface 44. Thus, the work piece is supported by flat surface to surface contact between its annular surface 38 and the annular surface 44 of the adapter plate.

As so far described, the adapter plate 22 of FIGURES 3 and 4 may be produced from the adapter plate illustrated in FIGURES 1 and 2 by a machining operation which forms the recess 40, the channel 42, and the flat annular surface 44.

However, magnetic chuck adapter plates having the work piece supporting surfaces conformed to interfit with the work piece may be produced by a casting method in which a work piece or slightly modified replica thereof may be employed as a portion of the mold.

Figure 5:
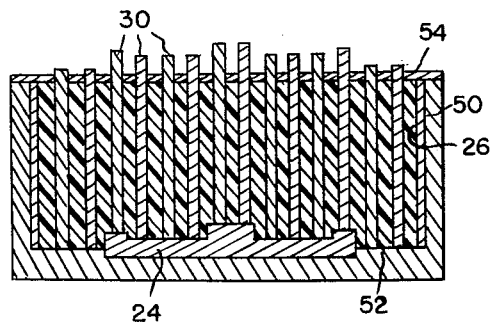
FIGURE 5 is a transverse sectional view through a mold showing the method of producing adapter plates conformed to a particular work piece.

In FIGURE 5 there is illustrated a method and apparatus for producing the magnetic chuck adapter by casting the adapter plate 22 illustrated in FIGURES 3 and 4. In this figure there is shown a mold 50 of generally cylindrical configuration having a bottom wall 52 recessed to receive a work piece 24 or a modified replica thereof. A circular perforated plate 54 is supported on the upper edge of the mold and is provided with a multiplicity of pin receiving and locating openings in which pins 56 are received. The pins of course are formed of iron or other magnetic material and are lowered into position such that the bottom ends thereof contact either the bottom wall 52 of the mold or the upper surface of the member 24. If desired, a pair of vertically spaced plates such as 54 are provided so that the pins may be held in accurate vertical parallel alignment. The interior surfaces of the mold and the exposed surfaces of the member 24 are treated with a suitable parting agent such for example as wax. Thereafter, the resin in liquid phase is poured into the mold and is caused to set therein. In general, the setting of the resin may be accomplished by thermal or chemical action. In the case of epoxy resin, which has proven itself to be exceptionally satisfactory, the curing of the resin or its transition from liquid to solid phase is accomplished primarily by chemical action accelerated by heat. After the epoxy resin has set the cast adapter plate is removed from the mold and its upper surface machined to a plane surface to engage in surface to surface contact with the upper surface of the magnetic chuck in use. Care must of course be exercised in the machining operation to produce the requisite degree of parallelism between the upper surface of the casting (which is its lower surface in use) and the effective work piece engaging surface of the adapter plate.

Reference is made to the fact that the member 24 could be either a work piece or a modified replica thereof. If a work piece 24 is employed in the casting, it will be appreciated that the recesses thus produced in the surface of the adapter plate will interfit closely in all dimensions with like work pieces. Thus, it will be necessary for proper coaction to use such an adapter plate only with work piece which are held to close tolerance.

In general, it is preferable to employ a modified replica of the work piece in which the central projection and peripheral flange are slightly enlarged so as to produce the clearance illustrated in FIGURE 4 of the drawings.

It may be mentioned that where the surface of the adapter plate engageable with the surface of the work piece is not a planar surface, it is not strictly necessary to have an end surface of each of the rods of magnetic material fully exposed in the surface of the adapter plate. Magnetic attraction is of course strongest when the ends of the rods of magnetic material are in surface to surface contact with the adjacent surfaces of the work piece. However, adequate holding action is obtained if the end surfaces of the rods of magnetic material are merely in close juxtaposition to adjacent surface portions of the work piece.

Figure 6:
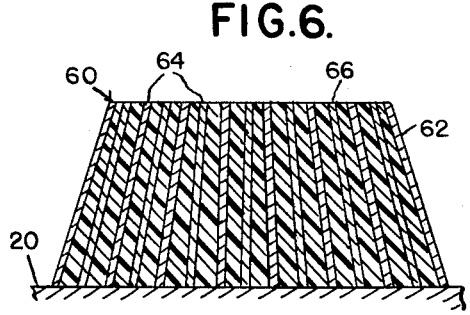
FIGURE 6 is a transverse sectional view through a modified form of adapter plate.

Referring now to FIGURE 6 there is illustrated an arrangement providing for a concentration of magnetic flux in a more limited area. In this case the adapter plate 60 is tapered so that its enveloping shell 62 is conical in shape. The rods 64 of magnetic material are all of uniform circular cross-section but are converged upwardly so as to produce a closer concentration at the upper surface 66 of the adapter plate than at its lower surface. Accordingly, the flux attributable to the larger area of the magnetic chuck 20 covered by the enlarged lower surface of the adapter plate is concentrated at the relatively smaller upper surface 66 thereof. It will of course be apparent that the adapter plate 60 in FIGURE 6 may be machined to form its upper surface to conform to an irregular work piece, or it may be provided with a conformed upper surface by casting in accordance with the method described in conjunction with FIGURE 4.

It will of course be apparent that a relatively large adapter plate may be produced by the present method in a casting in which a plurality of work pieces or replicas thereof are employed as portions of the bottom surface of the mold. Similarly, a relatively large adapter plate may be provided by machining with conformed nests or seats for a multiplicity of work pieces.

While the pins of magnetic material are disclosed herein as of circular cross-section, it will be understood that the cross-sectional shape of these pins is of no particular significance and the circular shape is illustrated merely because the rods may be most easily produced in this form. Actually, instead of rods of circular cross-section, it may in some cases be desirable to use strips. One such strip is illustrated at 70 of FIGURE 1. Particularly where the magnetic rods or strips are embedded in epoxy resin to produce adapter plates intended for subsequent machining, it is desirable to produce the magnetic rods or strips to have a machinability about equivalent to that of the epoxy resin. Thus, the magnetic material may be of soft iron or may be formed from powdered magnetic metal.

The adapter plate including the epoxy resin matrix may be made substantially impervious to wear by including abrasive material therein. In addition to substantially eliminating wear of the magnetic chuck adapter plates, this has the additional advantage of producing surfaces engageable with the work piece having a higher coefficient of friction, whereby less magnetic pull is required to produce equivalent resistance to transverse movement of the work piece on the adapter plate.

The drawing and the foregoing specification constitute a description of the improved magnetic chuck adapter plate in such full, clear, concise and exact terms as to enable any person skilled in the art to practice the invention, the scope of which is indicated by the appended claims.

What I claim as my invention is:

1. The method of making adapter plates for magnetic chucks comprising providing a mold with a forming member in its bottom wall corresponding to a work piece to be supported on the plate, arranging a multiplicity of elements of magnetic material in the mold in laterally spaced relation and with the lower portions of the elements resting upon the mold bottom including the portion thereof formed by said member, pouring a liquid resin into the mold to form a common matrix around the elements, causing the resin to harden, removing the adapter plate from the mold, and machining the surface thereof opposite that formed by the forming member into a flat surface for engagement with a magnetic chuck in which surface, surfaces of said elements are exposed.

2. The method of making a magnetic chuck adapter plate which comprises providing a mold, locating in one wall of the mold a forming member corresponding to the shape of the portion of a work piece to be engaged by the adapter plate, positioning a multiplicity of elongated flux conducting elements of magnetic material in substantially vertical laterally spaced relation in the mold with one end thereof substantially in contact with said member, pouring a liquid dimensionally stable resin in the mold to form a common matrix in which the elements are embedded, curing the resin, removing the casting from the mold and forming the surface of the casting opposite to that formed by the forming member to produce a chuck engaging surface in which the opposite ends of said elements are exposed.

3. The method of making a magnetic chuck adapter plate which comprises providing a mold, locating in one wall of the mold a forming member corresponding to the shape of the portion of a work piece to be engaged by the adapter plate, positioning a multiplicity of elongated flux conducting elements of magnetic material in substantially vertical, laterally spaced relation in the mold with one end of some of said elements in contact with said forming member, pouring a liquid dimensionally stable resin in the mold to form a common matrix in which the elements are embedded, curing the resin, removing the casting from the mold, and machining the surface of the casting opposite to that formed by said member to produce a flat chuck engaging surface in which the opposite ends of said elements are exposed.

4. The method of making adapter plates for magnetic chucks comprising providing a mold with a forming member in its bottom wall corresponding to a work piece to be supported on the plate, arranging a multiplicity of elongated rods of magnetic material in the mold in laterally spaced relation and with the lower portions of the rods resting upon the mold bottom including the portion thereof formed by said member, pouring a liquid epoxy resin into the mold to form a common matrix around the rods, causing the resin to harden, removing the adapter plate from the mold, and machining the surface thereof opposite the surface formed by the forming member into a flat surface perpendicular to said rods and in which surfaces of said rods are exposed 5. The method of making a magnetic chuck adapter plate which comprises providing a mold the bottom wall of which corresponds to the shape of the portion of a workpiece to be engaged by the adapter plate, positioning a multiplicity of elongated flux conducting elements in laterally spaced relation in the mold with one end thereof in contact with the bottom wall of the mold, pouring a liquid dimensionally stable resin into the mold to form a common matrix in which the elements are embedded, curing the resin, removing the casting from the mold and forming the casting to produce a chuck engaging surface in which the opposite ends of at least some of said elements are exposed.

6. The method of making a magnetic chuck adapter plate which comprises providing a mold, positioning a multiplicity of elongated flux conducting elements in laterally spaced relation in the mold with one end thereof in contact with said mold, pouring a liquid dimensionally stable resin into the mold to form a common matrix in which the elements are embedded, curing the resin, removing the casting from the mold and forming a chuck engaging surface on the casting in which the opposite ends of at least some of said elements are exposed.

References Cited in the file of this patent

UNITED STATES PATENTS

| | | |
|---|---|---|
| 1,312,546 | Karasick | Aug. 12, 1919 |
| 1,815,721 | McGraw | July 21, 1931 |
| 1,848,294 | Howie | Mar. 8, 1932 |
| 1,918,050 | Mattern | July 11, 1933 |
| 2,104,472 | St. Clair et al. | Jan. 4, 1938 |
| 2,327,748 | Smith | Aug. 24, 1943 |
| 2,401,887 | Sheppard | July 11, 1946 |
| 2,476,151 | Le Jeune | July 12, 1949 |
| 2,501,803 | Witbrod | Mar. 28, 1950 |
| 2,609,430 | Bower | Sept. 2, 1952 |
| 2,690,527 | Bohli | Sept. 28, 1954 |
| 2,691,905 | Onksen | Oct. 19, 1954 |